DEVICE AND METHOD FOR PRODUCING CODE MEMBERS

Filed Aug. 15, 1958 4 Sheets-Sheet 1

Inventors:
William H. Mahaney
Edward M. Jones
By: Graf, Nierman & Burmeister
Attorneys

DEVICE AND METHOD FOR PRODUCING CODE MEMBERS

Filed Aug. 15, 1958 4 Sheets-Sheet 2

Inventors:
William H. Mahaney
Edward M. Jones
By: Graf, Niesman & Burmeister
Attorneys DEVICE AND METHOD FOR PRODUCING CODE MEMBERS
Filed Aug. 15, 1958 
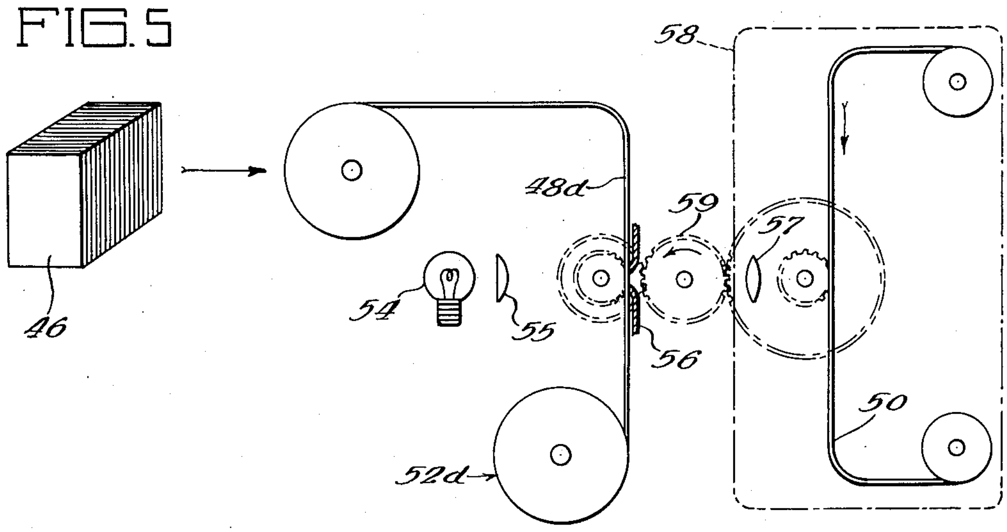
FIG. 6
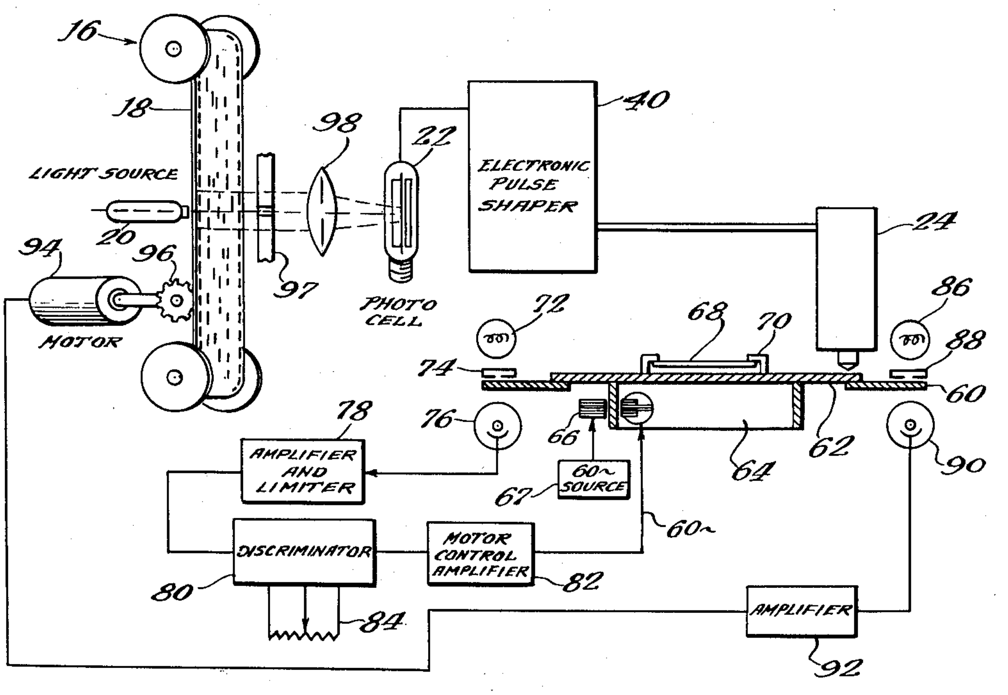
Inventors:
William H. Mahaney
Edward M. Jones
By: Graf, Nierman & Burmeister
Attorneys

DEVICE AND METHOD FOR PRODUCING CODE MEMBERS

Filed Aug. 15, 1958 4 Sheets-Sheet 4

Inventors:
William H. Mahaney
Edward M. Jones
By: Graf, Nierman & Burmeister
Attorneys 3,040,322
DEVICE AND METHOD FOR PRODUCING CODE MEMBERS

William H. Mahaney, Batavia, and Edward M. Jones, Cincinnati, Ohio, assignors to The Baldwin Piano Company, Cincinnati, Ohio, a corporation of Ohio Filed Aug. 15, 1958, Ser. No. 755,339
5 Claims. (Cl. 346—33)

This invention relates to devices and methods for producing members suitable for encoding analogue information, and particularly to devices and methods for producing code members for directly encoding angular shaft positions into digits representing nonlinear functions of the shaft angle.

Prior to the present invention, code discs have been provided for encoding analogue information into binary digits. Such code discs have a plurality of annular tracks of opaque and transparent sectors coaxially disposed about the center of the code disc. A light source may be disposed adjacent to one side of the code disc, and a light responsive cell confronts each of the tracks of the code disc on the other side of the code disc. With such a construction, the angular position of the shaft may be read in digital form by periodically sampling the response of the light responsive cells.

Code discs which employ either the straight binary or cyclic binary codes have been photographically produced on machines which periodically interrupt light from a light source focused upon a photosensitive emulsion on the disc while a turntable rotates the disc at a relatively constant rate. The frequency of the periodic pulses of light is synchronized with the rotation rate of the table so that a precise number of exposure areas occur in each revolution of the turntable.

If a code disc is to produce digits representing a nonlinear function of the shaft position, the transparent sectors in a given code track are not the same length, and therefore, the synchronization between the turntable and light source impulses cannot be achieved in the periodic manner previously employed. It is, therefore, one of the objects of the present invention to provide a device and method for producing encoding discs in which segments on a single code track of the disc are of different length.

It is a further object of the present invention to provide a device for generating digital values of a mathematical function in a sufficiently short time so that the generating device can be employed to control the exposure period of a code member producing machine.

It is a further object of the present invention to provide a code member producing machine having a device for generating digital values of a mathematical function, a movable base for carrying the code member, and means for synchronizing the generating device and the position of the base member.

It is a further object of the present invention to provide a device and method for utilizing punched cards to generate digital values of mathematical functions suitable for producing code members.

Further objects and advantages of the present invention will become apparent from a further reading of this disclosure, particularly when viewed in the light of the following drawings, in which:

FIGURE 5 is a front elevational view of a portion of the equipment illustrated in FIGURE 4;

FIGURE 6 is a schematic diagram illustrating a code disc producing device which constitutes another embodiment of the invention;

Figure 1:
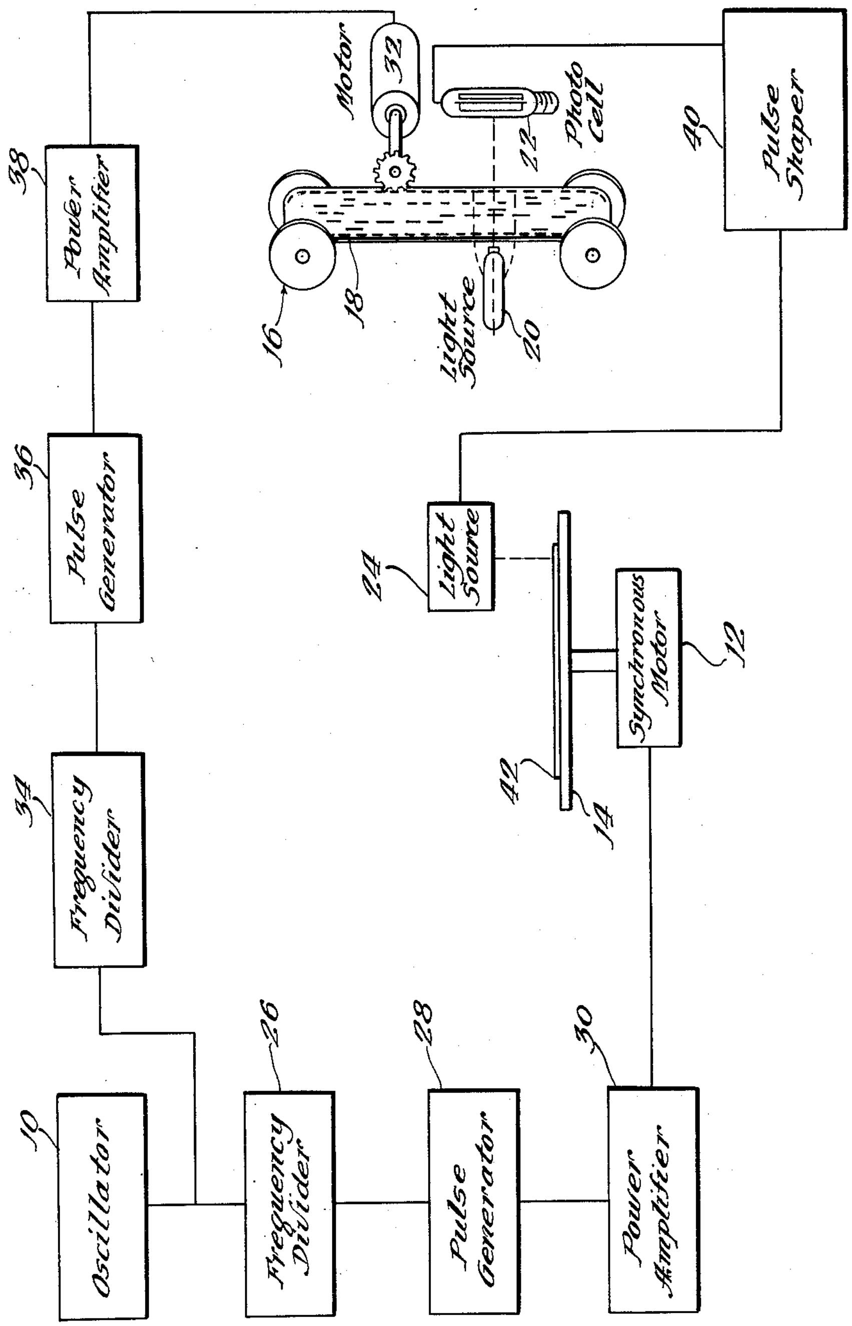
FIGURE 1 is a block schematic electrical circuit diagram of a machine for producing code discs according to the teachings of the present invention.

The patent application of Edward M. Jones entitled "Electronic Synchronizing System for Producing Pitch Discs and the Like," Serial No. 135,912, now U.S. Patent 2,839,960, issued June 24, 1958, discloses a machine for producing code discs on a turntable in which a single relatively high frequency oscillator is employed to generate power to drive a synchronous motor connected to the turntable and to generate pulses for controlling a light source to expose sectors of a photosensitive surface of a code disc disposed on the turntable. The embodiment of the invention illustrated in FIGURE 1 also employs a high frequency oscillator 10 which controls the frequency of a synchronous motor 12 driving a turntable 14, and the oscillator 10 also controls the speed of a strip translating device 16. The strip translating device 16 conveys an elongated strip 18, such as a photographic film, having transparent segments and opaque segments, and light from a source 20 passing through the strip 18 actuates a photoresponsive cell 22 to control a light source 24 focused on the turntable 14. In this manner, the oscillator 10 controls the rotation rate of the turntable 14 and also the number and relative position of pulses of light per revolution (of the turntable) impinging on the turntable.

The rotation rate of the turntable 14 and the translation rate of the strip transporting device 16 are not the same, the turntable rotating at a much slower rate. The oscillator 10 is connected to the synchronous motor 12 through a frequency divider 26, pulse generator 28 and power amplifier 30. A synchronous motor 32 also drives the strip transport mechanism 16, and the synchronous motor 32 is electrically connected to the oscillator 10 through a frequency divider 34, pulse generator 36 and power amplifier 38.

The light responsive cell 22, which may be a photocell, produces a response to each transparent sector of the strip 18, and this response is shaped by a shaper 40 and actuates the light source 24.

It is apparent that the exposure sectors of a photosensitive disc, designated 42, disposed on the turntable 14 need not be periodic, nor follow any mathematical function, since the transparent sectors of the film 18 may be arranged in any order and repeated merely by rerunning the strip. The foregoing device, therefore, converts whatever code is disposed on the strip 18 to a circular pattern and places it on the disc 42 as a closed circular pattern.

In order to produce code discs for encoding shaft angles into binary digits representing particular mathematical functions, such as the sine-cosine code disc disclosed in the patent application of Edward M. Jones entitled "Non-Linear Code Member," Serial No. 659,717, it is necessary to have the digital values of the mathematical function for a large number of angles, here referred to as the independent variable, the total number of values required depending upon the angular resolution of the code disc. For a code disc of sixteen digits, it is desirable to employ in the neighborhood of 30,000 values of a trigonometric function. While these values may be calculated by any mathematical means, it is convenient to employ commerically available punched cards, such as illustrated in FIGURE 3, which are produced by a computer, designated 44 in FIGURE 2. The commercially available punched cards, however, do not contain a sufficient number of digits on a single card for most code discs, the card of FIGURE 3 showing four digits designated 45A, 45B, 45C, and 45D for 57 values, and, therefore, a plurality of cards 46 are employed to show the binary code values for each calculated angle, FIGURE 2 illustrating four such cards designated 46A, 46B, 46C, and 46D mounted adjacent to each other, the cards giving the binary code for a mathematical function of a particular angle when read along a vertical axis.

Figure 2:
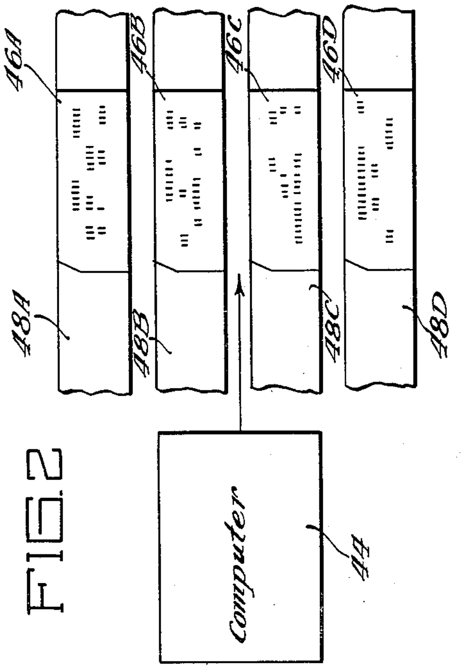
FIGURE 2 is a schematic diagram illustrating a portion of the equipment employed to utilize punched cards to generate mathematical functions in a form suitable for encoding.
Figure 3:
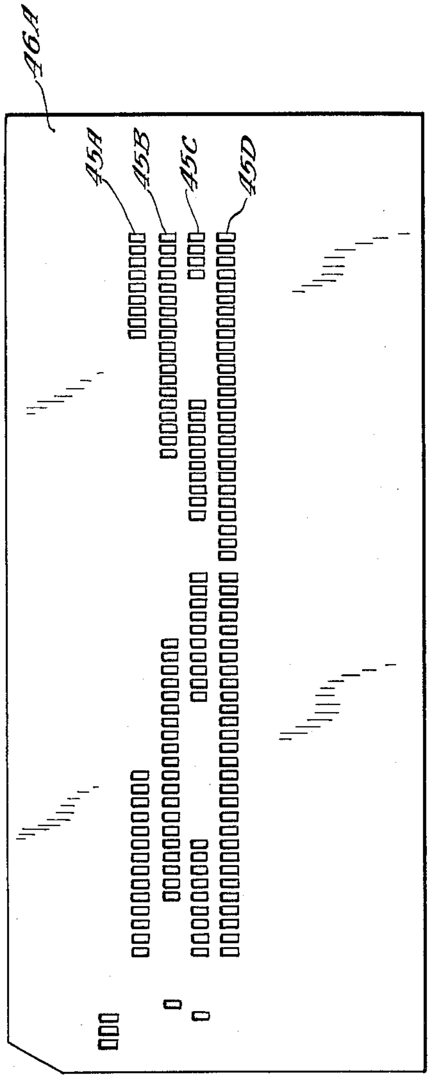
FIGURE 3 is a view illustrating an example of a punched card of the type shown in FIGURE 2.

Since the cards may not be directly employed to control a circle dividing machine, the information from the cards is transferred to tapes, again four tapes being employed and designated 48A, 48B, 48C, and 48D, this process being indicated in FIGURE 2. Each card is punched to contain the information required for a plurality of values of the function to be impressed upon the coding disc, for example, a single card may contain the least significant digit and next three more significant digits for sixty-three adjacent values of the independent variable. To obtain all values of the independent variable for angular deviations from zero to 90 degrees, as required for trigonometric functions, a plurality of cards are employed and transferred one after another to a tape, as by perforating the tape 48A to correspond to the perforations in the card 46A. In this manner, a plurality of tapes, each perforated to contain the binary values for several digits of the code are obtained.

As is clear from FIGURE 3, the punched cards have an individual punch for each value of the independent variable in those tracks requiring a digital unit, or a blank space where a digital zero is required. This gives the effect of transparent sectors in a given track of a tape which include a plurality of adjacent punches, although the transparent sector is actually made up of a plurality of individual punches.

The tapes 48A, 48B, 48C, and 48D are most easily fabricated of paper, and for a sixteen digit code, each tape is approximately 4000 feet long. The tapes 48A, 48B, 48C, and 48D must all be translated at exactly the same rate and synchronized relative to each other to encode a sixteen digit disc, although it is only necessary to translate a single tape at one time. Since the tapes must run their entire length during a single rotation of the turntable, or a 90 degree rotation of the turntable of a trigonometric function, it is impractical to directly encode a code disc from a tape fabricated directly from punched cards.

Figure 4:
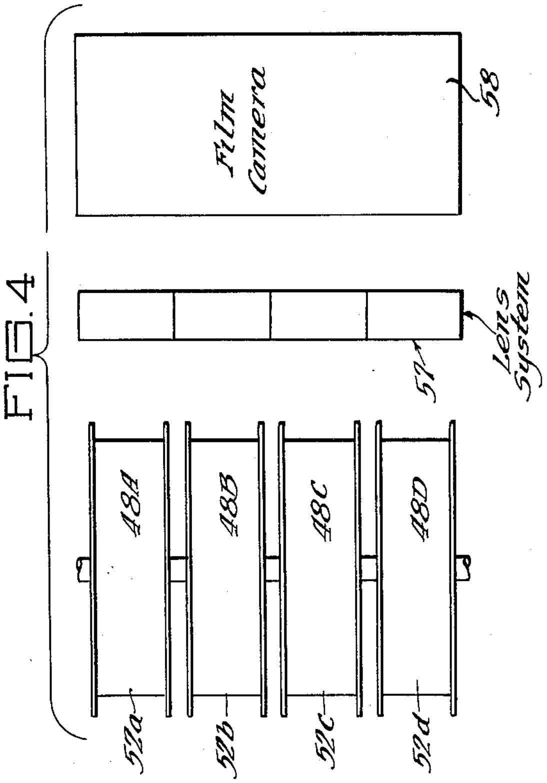
FIGURE 4 is a schematic diagram of a portion of the apparatus employed to provide a control media with indicia corresponding to a mathematical function for use in a code disc producing machine.

FIGURES 4 and 5 illustrate the step of transferring the information from the four tapes 48A, 48B, 48C, and 48D to a single film strip, designated 50. The four tapes are contained on translating devices 52A, 52B, 52C, and 52D, and a light source such as a lamp 54 is disposed on one side of each of the tapes and focused on the strip by a lens system 55. The light passing through each of the tapes passes through a slit 56 and is focused upon the film strip 50 by a lens 57. A motor 59 drives both the film strip 50 and the tapes 48A, 48B, 48C, and 48D. Because of the fact that the tapes 48A, 48B, 48C, and 48D are simultaneously translated at a speed equal to a multiple of that of the film 50, blurring of the image would result in the absence of the scanning slit 56 confronting each of the tapes. The film strip 50 is disposed within a camera 58 and has impressed thereon the information of all four tapes 48A, 48B, 48C, and 48D in adjacent relationship. In this manner, the information obtained from the punched cards wherein a single value of the independent variable requires a plurality of cards, is all impressed upon a single strip medium and reduced greatly in size.

In FIGURE 1, synchronization between the turntable 14 and the film transport mechanism 16 is obtained as a result of counting down the frequency of an oscillator 10 to produce the desired translation rate for the turntable and strip translating mechanism. In FIGURE 6, a circle dividing machine is illustrated in which the tape translating mechanism 16 is synchronized to the turntable 14 in a different manner.

In FIGURE 6, a ring 60 is coaxially disposed about the axis of a turntable 62. The ring 60 is provided with equally spaced transparent and opaque sectors of equal length, as fully described in the patent application of Edward M. Jones entitled "Electronic Synchronizing System," Serial No. 436,831, filed June 15, 1954, now Patent No. 2,924,138. The turntable 62 has a depending cylindrical portion 64, and a two phase eddy current motor is disposed adjacent to the cylindrical portion 64 and drives the turntable 62 from a 60 cycle source 67. The photographic surface, designated 68, is mounted on the top of the turntable 62 by a mounting means 70.

A light source 72 confronts the ring 60, and a grating 74 is disposed between the light source 72 and the ring 60. The grating has radial transparent slots of equal width and equal spacing as the ring 60. A photoresponsive cell 76 is disposed on the side of the ring opposite the light source 72 and aligned with the grating 74 and light source 72.

The photocell 76 is connected to an amplifier and limiter 78 which drives a discriminator 80. The output of the discriminator 80 is proportional to frequency and controls the amplitude of a motor control amplifier 82. The motor control amplifier 82 is connected to one portion of the two phase motor 66 and controls the amplitude of the excitation of this portion of the motor. The other portion of the motor 66 is driven directly from the alternating current power source 67. The discriminator 80 is provided with a variable resistor 84 for controlling the speed of the motor 66.

A second light source 86 confronts the ring 60, and a second grating 88 is disposed between the light source 86 and the ring 60. A photoresponsive cell 90 is disposed on the side of the ring 60 opposite the light source 86 and aligned with the grating 88. The photocell 90 is connected to an amplifier 92, and the amplifier 92 is connected to a synchronous motor 94. The synchronous motor 94 has a sprocket 96 which engages the perforations in the film strip 18, and thereby drives the transport mechanism 16. The light source 20 is disposed on one side of the film strip 18, and the photoresponsive cell 22 is disposed on the opposite side of the film strip 18. A slit 97 and a lens 98 focus and restrict the light impinging upon the photocell 22 from the light source 20. The photocell 22 is connected to an electronic pulse shaper 40 which actuates the light source 24 confronting the photosensitive surface of the turntable.

In this embodiment of the invention, elements which are identical to those employed in the first embodiment of the invention have been designated by the same reference numerals. Also, it is to be noted that the film strip 18 is synchronized with the position of the turntable 62, since the frequency of the alternating current power driving the synchronous motor 94 is derived from the ring 60 mounted to the turntable 62.

Figures 7, 8:
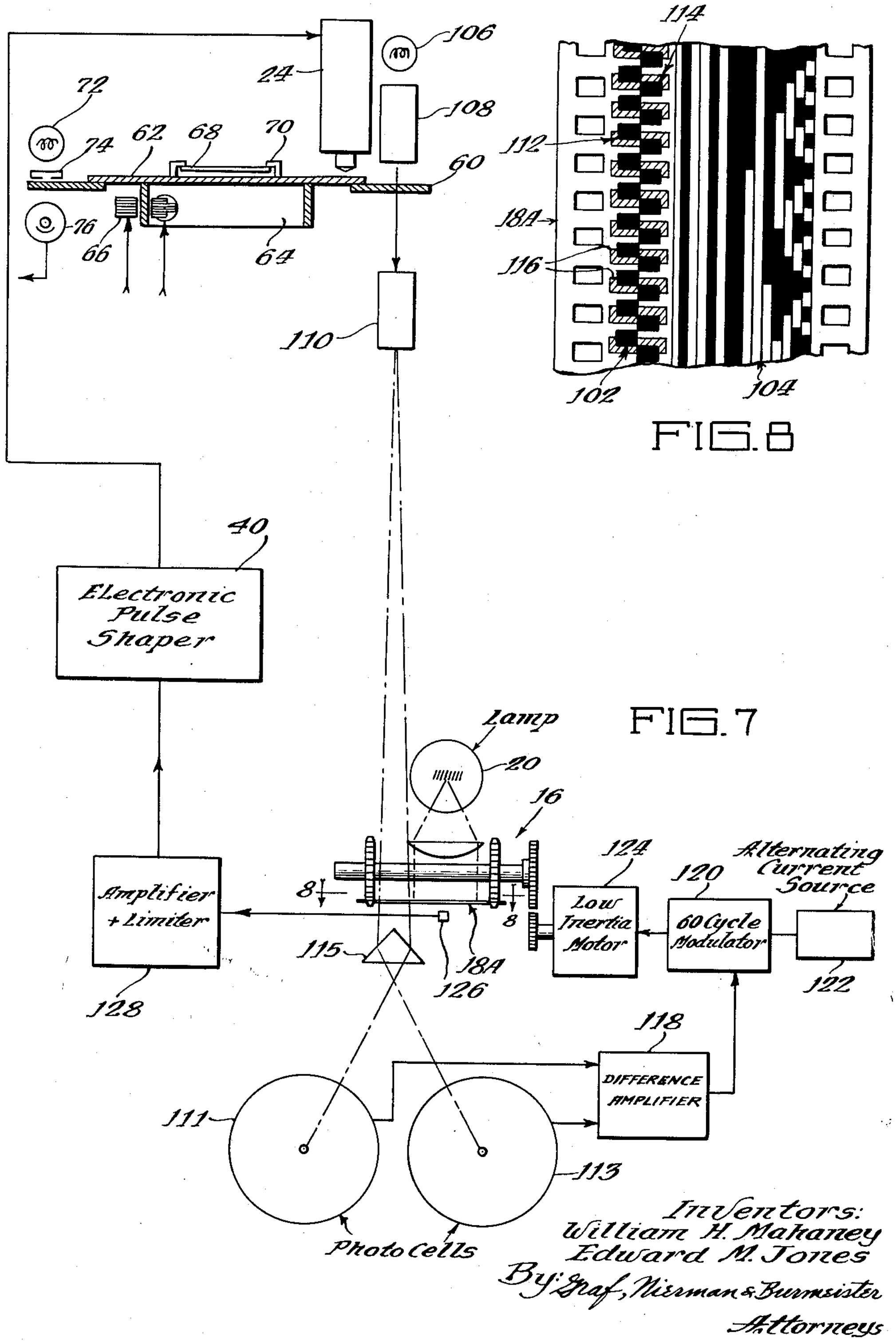
FIGURE 7 is a schematic electrical circuit diagram illustrating a further embodiment of a code disc producing machine constructed according to the teachings of the present invention.
FIGURE 8 is a view taken along line 8—8 of FIGURE 7 illustrating synchronization of the reference pattern of the film with an image of the reference pattern on the disc mounting means.

FIGURES 7 and 8 illustrate another embodiment of the present invention. In this embodiment, the turntable, ring, and turntable drive means are identical to those described in FIGURE 6, and the same reference numerals have been employed to designate these elements. In this embodiment of the invention, the rotation rate of the turntable 62 is synchronized with a reference track or portion 102 positioned on a film strip 18A. The film strip 18A also contains a second portion 104 which contains the same parallel tracks as the film strip 18 for the purpose of actuating a light source.

The film transport mechanism 16 is mounted on one side of the ring 60, and a light source 106 is mounted on the other side of the ring 60. A lens system 108 is disposed between the light source 106 and the ring 60, and a second lens system 110 is disposed between the ring 60 and the strip transport mechanism 16. The film strip 18A is mounted on the strip transport mechanism 16 with the reference track 102 aligned with the light source 106, lens system 108, and lens system 110, and an image of the slits of the ring 60 is thereby superimposed upon the reference track 102. There is no grating, such as the grating 88 of FIGURE 6, disposed adjacent to the ring 60, so that the image of the ring 60 travels with the film strip 18A.

A pair of photocells 111 and 113 are disposed radially of the turntable on the side of the film strip opposite the light source 106 and on opposite sides of the optical axis from the light source 106 through the reference track 102. A prism 115 is disposed between the photocells and the film strip 18A on the optical axis of the light source and reference track. The prism 115 reflects light passing through the radially outward portion of the transparent slots of the ring 60 to the photocell 111, and the radially inward portion of the light passing through the slots of the ring 60 to the photocell 113.

The reference portion 102 of the film strip is formed by two adjacent coded tracks, designated 112 and 114. The tracks 112 and 114 have equally spaced transparent segments of equal length, the transparent and opaque segments of each portion being equal in length, but the opaque portions of one track are disposed immediately adjacent to the transparent portions of the other track. Also, the images of the transparent portions of the ring 60 are spaced from each other by the same distance as the transparent segments of the tracks 112 and 114. As illustrated in FIGURE 8, the image of the slits of the ring 60 are disposed upon a portion of the transparent segments of the two tracks 112 and 114 of the reference portion 102, the image being designated 116 and illustrated in section in FIGURE 8. As a result, the amount of light impinging upon each of the photocells 111 and 113 under these conditions is equal. In the event the ring 60 leads or lags the film strip 18A, more light will be transmitted to one of the photocells 111 or 113 than the other.

The photocells 111 and 113 are connected to the inputs of a difference amplifier 118, and the output of the difference amplifier 118 is connected to a sixty cycle modulator 120. A sixty cycle alternating current source 122 is also connected to the input of the sixty cycle modulator 120, and the amplitude-modulated output of the sixty cycle modulator 120 is connected to a low inertia motor 124, which may be an eddy current motor, such as motor 66. The motor 124 drives the sprockets of the strip transport mechanism 16.

If the film strip 18A leads or lags the ring 60, a difference voltage is developed in the difference amplifier 118, and this potential is employed to vary the amplitude of the alternating current from the source 122, and hence change the speed of the motor 124 to compensate for the difference in the rotation rate of the turntable 62 and the translation rate of the film strip 18A.

As illustrated in FIGURE 7, the light source 20 focuses a beam of light on the film strip 18A, and a light responsive np junction photocell 126 detects the amplitude of the light passing through one track of the film strip 18A. An amplifier and limiter 128 is connected to the photocell 126 which drives the electronic pulse shaper 40, which in turn actuates the light source 24 confronting the photosensitive surface on the turntable.

From the foregoing disclosure, those skilled in the art will readily devise many modifications and improvements of the present invention. It is, therefore, intended that the scope of the present invention be not limited by the foregoing disclosure, but rather only by the appended claims.

The invention claimed is:

1. A device for exposing sectors of a photosensitive surface comprising the combination including a disc, means for rotatably mounting the disc, drive means mechanically coupled to the mounting means for rotating the disc, a first light source mounted on the disc mounting means and focused on the photo-sensitive surface of the disc, a strip transport mechanism, drive means mechanically coupled to the strip transport mechanism, a strip mounted on the transport mechanism having a track containing a plurality of transparent segments spaced by opaque segments, a second light source disposed on one side of the strip, a light responsive cell disposed on the other side of the strip, means to interrupt light from the first source electrically connected to the light responsive cell, and means to synchronize the strip transport means and the drive means for rotating the disc wherein the drive means for the strip transport mechanism comprises a ring mounted coaxially about the rotatable disc mounting means having a circular track with a plurality of transparent radial sectors of equal width separated by opaque radial sectors of equal width, a light source mounted on the disc mounting means confronting the track on one side of the ring, a photocell mounted to the disc mounting means on the opposite side of the ring aligned with the track and light source, and a synchronous motor electrically connected to the photocell and mechanically coupled to the film strip transport mechanism.

2. A device for exposing sectors of a photosensitive surface comprising the combination including a disc, means for rotatably mounting the disc, drive means mechanically coupled to the mounting means for rotating the disc, a first light source mounted on the disc mounting means and focussed on the photosensitive surface of the disc, a strip transport mechanism, drive means mechanically coupled to the strip transport mechanism, a strip mounted on the transport mechanism having a track containing a plurality of transparent segments spaced by opaque segments, a second light source disposed on one side of the strip, a light responsive cell disposed on the other side of the strip, means to interrupt light from the first source electrically connected to the light responsive cell, and means to synchronize the strip transport means and the drive means for rotating the disc wherein the drive means for the strip transport mechanism comprises a ring mounted coaxially on the rotatable disc mounting means having a circular track with a plurality of transparent radial sectors of equal width separated by opaque radial sectors of equal width, a light source mounted on the disc mounting means confronting the track on one side of the ring, a pair of spaced photocells mounted on the side of the ring opposite the light source with the axis therebetween disposed approximately normal to the tangent to the track of the ring, means disposed between the ring and the photocells to direct light passing through a radially inward portion of the track to one photocell and light passing through a radially outward portion of the track to the other photocell, a difference amplifier having an input electrically connected to each photocell and an output, a modulator electrically connected to the output of the difference amplifier and an alternating current source, the drive means for the strip transport mechanism being a two phase variable speed motor electrically connected to the modulator and mechanically coupled to the strip transport mechanism, and the strip transport mechanism being mounted on the disc mounting means with the strip path parallel to the tangent of the ring track and between the ring and the light directing means.

3. A device for exposing sectors of a photosensitive surface comprising the elements of claim 2 wherein the strip mounted on the strip transport mechanism is provided with a pair of longitudinal tracks extending between the light source and light directing means, said tracks being adjacent to each other and having a plurality of transparent sectors of equal length separated by opaque sectors approximately equal in length to the image of the opaque sectors of the ring track at the strip, the transparent sectors of the first track being adjacent to the opaque sectors of the second track, the first track being aligned with the radially inward portion of the ring track, light source and the light directing means, and the second track being aligned with the radially outward portion of the ring track, light source and light directing means.

4. A device for exposing sectors of a photosensitive surface comprising the combination including a disc, means for rotatably mounting the disc, drive means mechanically coupled to the mounting means for rotating the disc, a first light source mounted on the disc mounting means and focused on the photosensitive surface of the disc, a strip transport mechanism, a drive means mechanically coupled to the strip transport mechanism, a strip mounted on the transport mechanism having a track containing a plurality of transparent segments spaced by opaque segments, a second light source disposed on one side of the strip, a light responsive cell disposed on the other side of the strip, means to interrupt light from the first source electrically connected to the light responsive cell, and means to synchronize the strip transport means and the drive means for rotating the disc wherein the drive means for the strip transport mechanism comprises a ring mounted coaxially to the rotatable disc mounting means having a circular track with a plurality of transparent radial sectors of equal width separated by opaque radial sectors of equal width, a light source mounted to the disc mounting means confronting the track on one side of the ring, a pair of spaced photocells mounted on the side of the ring opposite the light source with the axis therebetween disposed approximately normal to the tangent to the track of the ring, means disposed between the ring and the photocells to direct light passing through a radially inward portion of the track to one photocell and light passing through a radially outward portion of the track to the other photocell, a difference amplifier having an input electrically connected to each photocell and an output, the drive means for the strip transport mechanism being electrically coupled to the difference amplifier and having a rate responsive to the output of the difference amplifier, and the strip transport mechanism being mounted to the disc mounting means with the strip path parallel to the tangent of the ring track and between the ring and the light directing means.

5. A device for exposing sectors of a photosensitive surface comprising the elements of claim 4 wherein the strip mounted on the strip transport mechanism is provided with a pair of lonigtudinal tracks extending between the light source and light directing means, said tracks being adjacent to each other and having a plurality of transparent sectors of equal length separated by opaque sectors approximately equal in length to the image of the opaque sectors of the ring track at the strip, the transparent sectors of the first track being adjacent to the opaque sectors of the second track, the first track being aligned with the radially inward portion of the ring track, light source and the light directing means and the second track being aligned with the radially outward portion of the ring track, light source and light directing means.

References Cited in the file of this patent

UNITED STATES PATENTS

| | | |
|---|---|---|
| 1,836,691 | Tuttle | Dec. 15, 1931 |
| 1,838,389 | Goldberg | Dec. 29, 1931 |
| 2,102,708 | Howle | Dec. 21, 1937 |
| 2,172,300 | Bryce | Sept. 5, 1939 |
| 2,196,166 | Bryce | Apr. 2, 1940 |
| 2,323,829 | Ross | Feb. 25, 1941 |
| 2,463,534 | Hawkins | Mar. 8, 1949 |
| 2,592,018 | Fairbanks | Apr. 8, 1952 |
| 2,596,741 | Tyler et al. | May 13, 1952 |
| 2,641,997 | Butterfield | June 16, 1953 |
| 2,697,649 | Roth | Dec. 21, 1954 |
| 2,697,754 | Ranger | Dec. 21, 1954 |
| 2,760,404 | King | Aug. 28, 1956 |
| 2,765,211 | Brinster et al. | Oct. 2, 1956 |
| 2,784,397 | Branson et al. | Mar. 5, 1957 |
| 2,839,960 | Jones | June 24, 1958 |
| 2,857,567 | Jakosky | Oct. 21, 1958 |
| 2,859,673 | Hix et al. | Nov. 11, 1958 |